US008315762B2

(12) United States Patent
Correa et al.

(10) Patent No.: US 8,315,762 B2
(45) Date of Patent: Nov. 20, 2012

(54) SERVER DESIGN AND METHOD

(75) Inventors: Paulo Correa, Laguna Niguel, CA (US); Anh Nguyen, Fullerton, CA (US)

(73) Assignee: Thales Avionics, Inc., Irvine, CA (US)

( * ) Notice: Subject to any disclaimer, the term of this patent is extended or adjusted under 35 U.S.C. 154(b) by 836 days.

(21) Appl. No.: 12/112,154

(22) Filed: Apr. 30, 2008

(65) Prior Publication Data

US 2008/0312778 A1 Dec. 18, 2008

Related U.S. Application Data

(60) Provisional application No. 60/924,101, filed on Apr. 30, 2007.

(51) Int. Cl.
*G06F 7/00* (2006.01)
*H04N 7/18* (2006.01)

(52) U.S. Cl. .......... 701/36; 701/3; 725/75; 725/76; 725/77

(58) Field of Classification Search ............. None
See application file for complete search history.

(56) References Cited

U.S. PATENT DOCUMENTS

| | | | |
|---|---|---|---|
| 6,505,106 B1* | 1/2003 | Lawrence et al. | 701/35 |
| 6,981,042 B1* | 12/2005 | Rey | 709/225 |
| 7,028,304 B1 | 4/2006 | Weinberger et al. | |
| 7,280,825 B2* | 10/2007 | Keen et al. | 455/431 |
| 7,587,734 B2* | 9/2009 | Logan et al. | 725/76 |
| 2003/0217363 A1* | 11/2003 | Brady et al. | 725/76 |
| 2005/0132400 A1* | 6/2005 | Liao et al. | 725/32 |
| 2006/0143661 A1* | 6/2006 | Funderburk et al. | 725/76 |
| 2006/0143662 A1* | 6/2006 | Easterling et al. | 725/78 |
| 2006/0174285 A1 | 8/2006 | Brady, Jr. et al. | |
| 2006/0271967 A1* | 11/2006 | So | 725/76 |
| 2007/0130591 A1* | 6/2007 | Brady et al. | 725/76 |
| 2008/0086726 A1* | 4/2008 | Griffith et al. | 718/1 |
| 2010/0122334 A1* | 5/2010 | Stanzione et al. | 726/11 |

OTHER PUBLICATIONS www.vmware.pdf, VMware, Supported Guest Operating Systems, http://www.vmware.com/support/ws5/doc/intro_supguest_ws. html archived Dec. 25, 2005 on http://web.archive.org Wayback Machine webpage.*
Microsoft_virtualization_brief.pdf, Microsoft, Licensing Microsoft Server Products with Microsoft Virtual Server and Other Virtual Machine Technologies, p. 1-12, Oct. 2006.*

(Continued)

*Primary Examiner* — Khoi Tran
*Assistant Examiner* — Bao Long T Nguyen
(74) *Attorney, Agent, or Firm* — Myers Bigel Sibley & Sajovec

(57) ABSTRACT

A communication system for a vehicle includes a server that includes a real time operating system, at least one cabin function application that runs on the real time operating system, and at least one in-flight entertainment application that runs on another operating system on top of the real time operating system. Thus, an in-operation entertainment system is capable of providing audio and/or visual content to a large number of locations in a cabin of the vehicle, and a cabin function system is capable of providing various cabin applications, e.g., lighting level control, attendant calling, air conditioning control, etc. at different locations in the vehicle cabin in a manner that is isolated and prioritized over the entertainment system.

24 Claims, 5 Drawing Sheets

OTHER PUBLICATIONS

VMware (VMware, Supported Guest Operating Systems, http://www.vmware.com/support/ws5/doc/intro_supguest_ws.html archived Dec. 25, 2005 on http://web.archive.org Wayback Machine webpage).* webopedia (webopedia.com, virtual machine, http://www.webopedia.com/TERM/V/virtual_machine.html, May 24, 2002, archived Nov. 2, 2006 on http://web.archive.org Wayback Machine webpage).*

Microsoft (Microsoft, Licensing Microsoft Server Products with Microsoft Virtual Server and Other Virtual Machine Technologies, p. 1-12, Oct. 2006).*

* cited by examiner

SERVER DESIGN AND METHOD

CROSS REFERENCE TO RELATED APPLICATIONS

The present application claims the benefit of U.S. Provisional Application No. 60/924,101, filed Apr. 30, 2007, herein incorporated by reference.

BACKGROUND OF THE INVENTION

1. Field of the Invention

The present invention relates to a system and method for providing in-flight entertainment (IFE) and cabin functions throughout a cabin of a vehicle, such as an aircraft. More particularly, the present invention relates to a design of a server system and method for interfacing IFE and cabin function systems that may include multiple devices of different levels of security.

2. Description of Related Art

The head-end in a related integrated IFE and cabin function system is typically the most expensive individual part of an overall cabin function system. Requirements for these related systems include servers in the head-end that provide redundancy for each of the digital access layer (DAL) services and that securely isolate the cabin functions.

SUMMARY

The present invention is directed to a communication system for a vehicle, comprising: a server including a real time operating system; at least one cabin function application related to operating a hardware component of the vehicle cabin running on the real time operating system; and at least one in-operation entertainment application related to operating an entertainment system running on an other operating system on top of the real time operating system of the server.

Integration of the cabin functions and entertainment functions reduces costs and improves performance of cabin function systems. Thus, it is desirable to develop an open standard from which IFE and cabin function services can be procured from different vendors. Therefore, there is a need for a server architecture that is capable of interfacing both the IFE and cabin function systems while at the same time providing different levels of security and isolation between the cabin functions and the entertainment functions.

Protection and isolation can be achieved by a firewall and multiple levels of security. The major advantage of this solution is the improved performance, lower overall cost, and comprehensive architecture that increases the system integrator's technical capability.

BRIEF DESCRIPTION OF THE DRAWINGS

The accompanying drawings, which are incorporated herein and constitute part of this specification, illustrate exemplary embodiments of the invention, and together with the general description given above and the detailed description given below, serve to explain features of the invention.

DETAILED DESCRIPTION OF EMBODIMENTS

Cabin Layout and IFE Functionality

Embodiments of the present invention provide a system and method for presenting video and associated audio to multiple presentation devices, such as multiple video players and multiple audio headsets in an IFE system in a vehicle. This environment is typically an airplane, train, bus, boat, ship, or other multi-passenger vehicle where there are multiple overhead video monitors being viewed by multiple passengers who listen to the audio associated to the overhead video program through a headset plugged into an audio jack local to the passenger's seat. The IFE system is capable of providing audio and/or visual content to a large number of locations in the vehicle cabin.

Figure 1A:
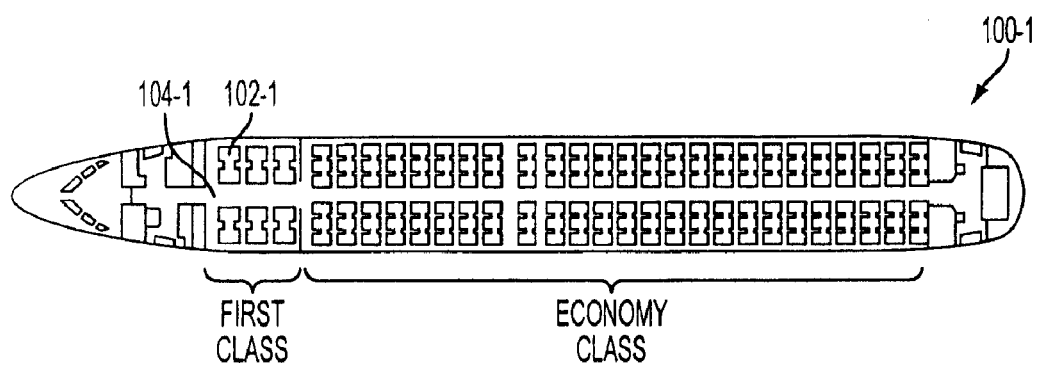
FIGS. 1A and 1B are pictorial diagrams illustrating examples of seating layouts for commercial aircraft in which an embodiment of the present invention may be employed.
Figure 1B:
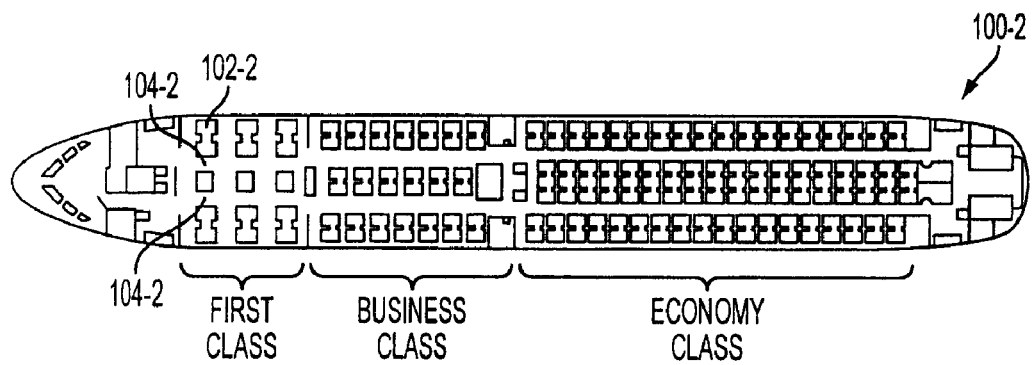
Figure 2:
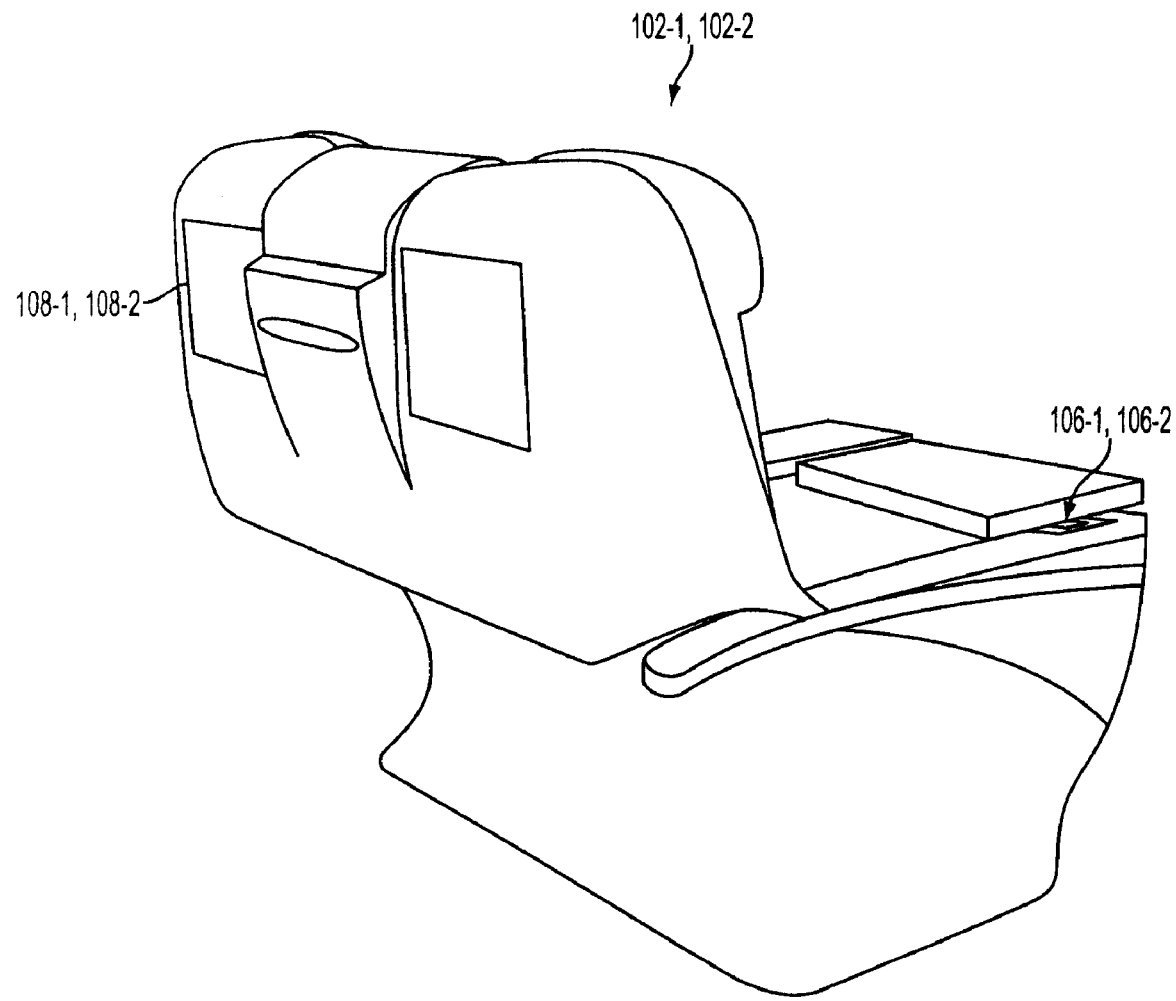
FIG. 2 is an isometric pictorial view illustrating an example of an in-seat video player arrangement for the commercial aircraft as shown in FIGS. 1A and 1B.

FIGS. 1A and 1B illustrate examples of typical seating arrangements for two different aircraft 100-1 and 100-2. As shown, the environment of an IFE system for the aircraft 100-1 or 100-2 includes a densely packed population of passenger seats 102-1 or 102-2 (hereinafter generically referred to as a seat or seats 102) organized into rows and columns. Seats are typically organized into groups of from 2 to 4 side-by-side seats, and seat groups are placed into long rows running between the front and back of the aircraft. Short distance aircraft 100-1 typically have two rows of seat groups with the center aisle 104-1 for access. Longer distance aircraft 100-2 typically have three rows of seat groups with two aisles 104-2 for access. As shown in FIG. 2, each passenger seat 102 is provided with a headset jack 106-1 or 106-2 (hereinafter generically referred to as headset jack or jacks 106) into which an audio headset can be plugged.

Entertainment audio is typically presented to each passenger over their respective headset. Entertainment video is typically presented to passengers in two different ways, either via overhead video monitor 124 (see FIG. 3) or via an in-seat video player 108-1 or 108-2 (see FIG. 2). In the overhead video arrangement, an aircraft 100-1 or 100-2 is fitted with a number of overhead video monitors 124 to which a video program can be supplied. Overhead video systems have evolved from those which provided a single video projector in each class of the aircraft cabin to current systems which provide a large number of individual monitors hung from the ceiling or baggage bins. In current systems, each passenger can choose to watch the overhead monitor most convenient for their personal viewing.

In the in-seat video player arrangement, the aircraft 100-1 or 100-2 is equipped with individual video players 108-1 or 108-2 (hereinafter generically referred to as a video player or players 108) for each passenger seat 102, as shown in FIG. 2, which provides each passenger with an individualized entertainment experience. It is common to combine both types of video presentation into an aircraft, and it is also common to differentiate service to different passenger classes (e.g., in-seat video for first and business classes, and overhead video in economy class). In either case, the overhead video monitors and in-seat video players 108 communicate with an IFE system 110 as shown in FIG. 3.

Figure 3:
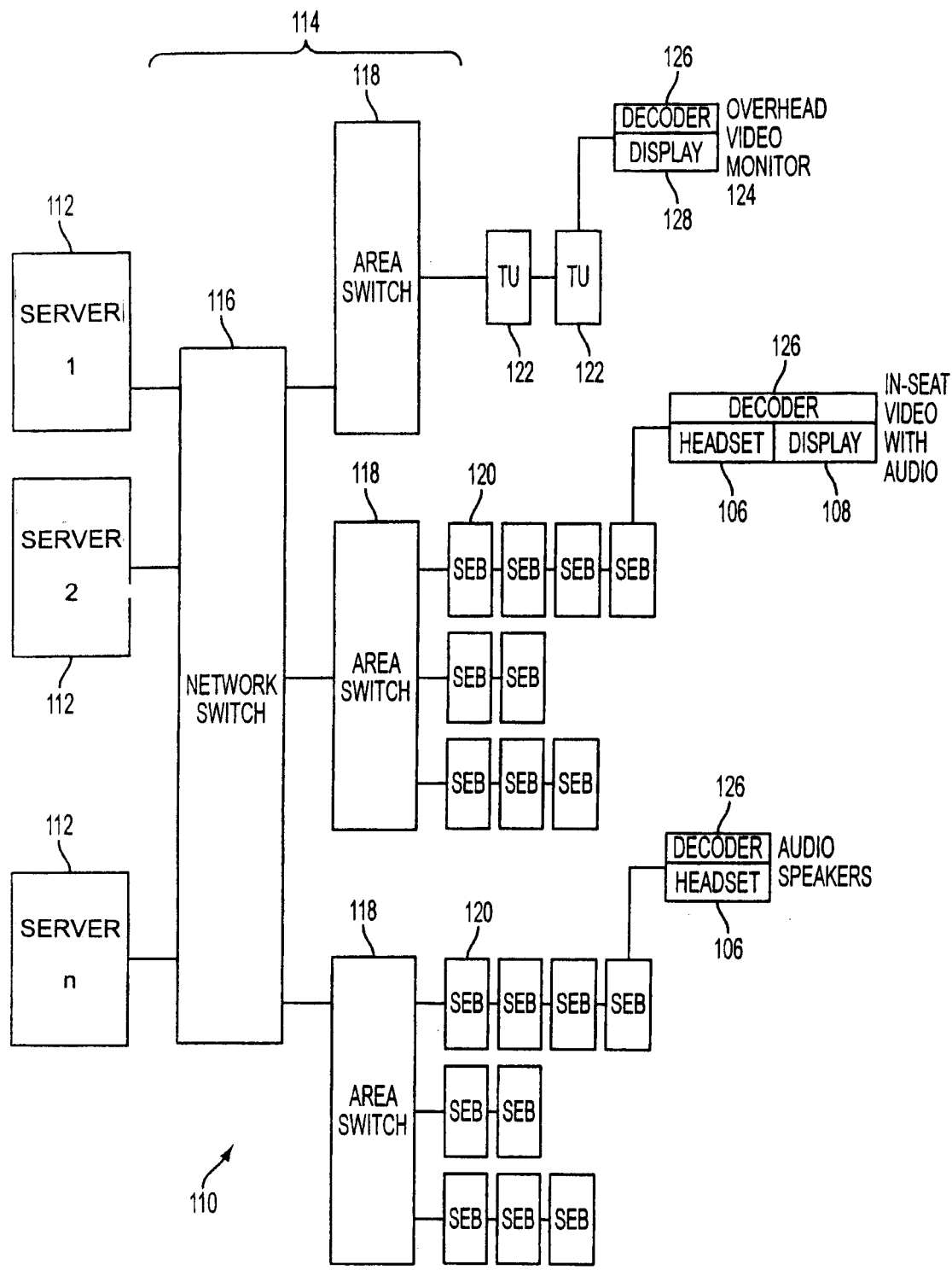
FIG. 3 is a conceptual block diagram illustrating an example of an IFE system employed in an aircraft as shown in FIGS. 1A and 1B and which may employ an embodiment of the present invention.

An example of the physical architecture of the digital network in a typical IFE system 110 is further illustrated in FIG. 3. The basic components are a set of head end servers 112, a distribution network 114 that can include one or more network switches 116 and a plurality of area switches 118, and columns of seat components such as seat electronic boxes (SEBs) 120 and tapping units 122. The servers 112 may be digital servers (e.g., preloaded with MPEG digital content) or may be real-time encoders capable of converting input video and audio into MPEG data. The network switch 116 can be, for example, a layer 2 or layer 3 Ethernet switch, and is configured to connect any server 112 to any component of the IFE system 110 of the aircraft. An area switch 118 is provided in each area of the aircraft 100-1 or 100-2 to connect the network switch 116 to multiple columns of seats. In this example, each area switch 118 connects to three seat columns, but the number of seat columns to which an area switch 118 connects can vary as desired.

Each seat group as discussed above is fitted with an SEB 120, and the components at the seats 102, such as the video players 108 and headset jacks 106, are wired from an area switch 118 through a number of SEBs 120 arranged in a seat column. As can be appreciated by one skilled in the art, an SEB 120 extracts data packets intended for locally attached players (decoders) and passes other packets through to the next SEB 120 in the seat column as required.

As further shown in FIG. 3, each overhead monitor 124 typically includes or is associated with a decoder 126 and a display 128. The overhead monitors 124 are, in this exemplary arrangement, connected to the IFE system 110 through a set of tapping units (TU) 122 that perform the same or similar functions as the SEBs 120. As also shown, each headset jack 106, and in-seat video player 108, includes or is associated with a decoder 126 that is connected to an SEB 120 as discussed above.

Many IFE systems 110 have multiple video programs stored on a server 112. When playback is desired, a video player (e.g., video player 108 or overhead monitor 124) obtains the material from the server 112 and decodes the compressed content into a presentable form. If the material is to be presented on overhead monitors 124 or in a video announcement that is to be simultaneously viewed by all passengers, the material typically can be decoded by a single player and distributed to all monitors using an analog distribution technique, e.g., through RF modulation or baseband distribution technologies. If the material is to be presented to a passenger on an individual basis (e.g., Video on Demand) then the passenger has a dedicated player (e.g., a video monitor 108), which can obtain a compressed digital program and decode it specifically for the passenger.

To support a broadcast program, a server 112 would typically transmit a digital stream throughout the digital network of the IFE system 110 using a network protocol appropriate for a one-to-many relationship. As can be appreciated by one skilled in the art, typically TCP/IP communications can be used for one-to-one communications. Also, a one-to-many network protocol, commonly referred to as a "multi-cast," can be combined with a fixed rate streaming protocol such as a Real-Time Protocol (RTP).

As can further be appreciated by one skilled in the art, multicast on an IP network typically assigns each multicast program a specific multicast IP address. The server 112 can then transmits the program onto the network (e.g., using RTP) with, for example, a broadcast layer 2 address and the assigned multicast layer 3 address. The network of the IFE system 110 can make this stream available to all network devices, such as video player 108 and overhead monitors 124. A player (e.g., video player 108) can present this program by "subscribing" to the program using the IGMP protocol specifying the desired multicast IP address. This process permits the streaming source to transmit a single data stream and have it received by all desired players on the network.

The example of the data network architecture described above with regard to FIG. 3 enables a server 112 to produce a single packetized video/audio stream which is available to all desired video players 108 and overhead monitors 124 in the aircraft 100-1 or 100-2. This arrangement allows for a personal, in-seat presentation of a common source program to requesting passengers.

Processor, Network, and Cabin Functions

The cabin functions of an aircraft are functionally separate from the IFE functions—the former are directed to operations relating to the cabin itself. These functions performed by the cabin function system may include things like (referring to FIG. 6) controlling hardware associated with the cabin lighting 410 (e.g., lighting level and lighting area control), the public address system PA 420 (attendant and captain calling), overhead 430, information signs 440, galleys 450, interphone 460, lavatories 470, smoke detectors 480, and environmental functions, such as air conditioning, and controlling/detecting these at different areas of the cabin.

The system may also include at least one wireless access point (WAP) 500 that may, in some situations, be used by passengers with laptop computers or other wireless devices. The WAP 500 provides wireless LAN network connectivity for airborne applications. A WAP 500 may be provided for both the IFE as well as the cabin functions. The WAP 500 may be connected to the IFE system to allow passenger wireless devices (e.g., laptops) to connect to on-board cache Web content and entertainment services, as well as off-aircraft connectivity services.

The WAP 500 is preferably ARINC 763 (Network Service System) compliant, and may be based on, e.g., the IEEE 802.11b standard. It may employ DSSS (Direct Sequence Spread Spectrum) and operate in the 2.4 GHz radio frequency band. Each WAP 500 has a range of at least 300 feet (or at least 100 meters), and transfers data effectively at rates of at least 11 Mbps. Moreover, additional WAPs can be daisy-chained together. Furthermore, some or all of the network of the IFE system and of the cabin function system may be wireless, using the WAP 500 to access the network.

According to an embodiment of the invention, the server 112 includes a multiple core microprocessor (e.g., Intel Xenon, Intel Itanium, etc.) capable of operating multiple tasks at the same time. A memory partition may separate a DAL-C (cabin functions) network and a DAL-E (IFE functions) network. Separate high capacity storage devices may be used that are based on different technologies. For example, one or more hard drives may be used for IFE functions such as video, audio and games applications, and a solid state flash memory may be used to store the cabin applications. The hard drive is less robust, but can hold more data and has a cheaper cost per megabyte. Its use for non-critical applications, therefore, is appropriate. The solid state flash memory has no moving parts and is therefore very robust, making it ideal for the more important cabin applications (which do not tend to comprise as much data).

Figure 4:
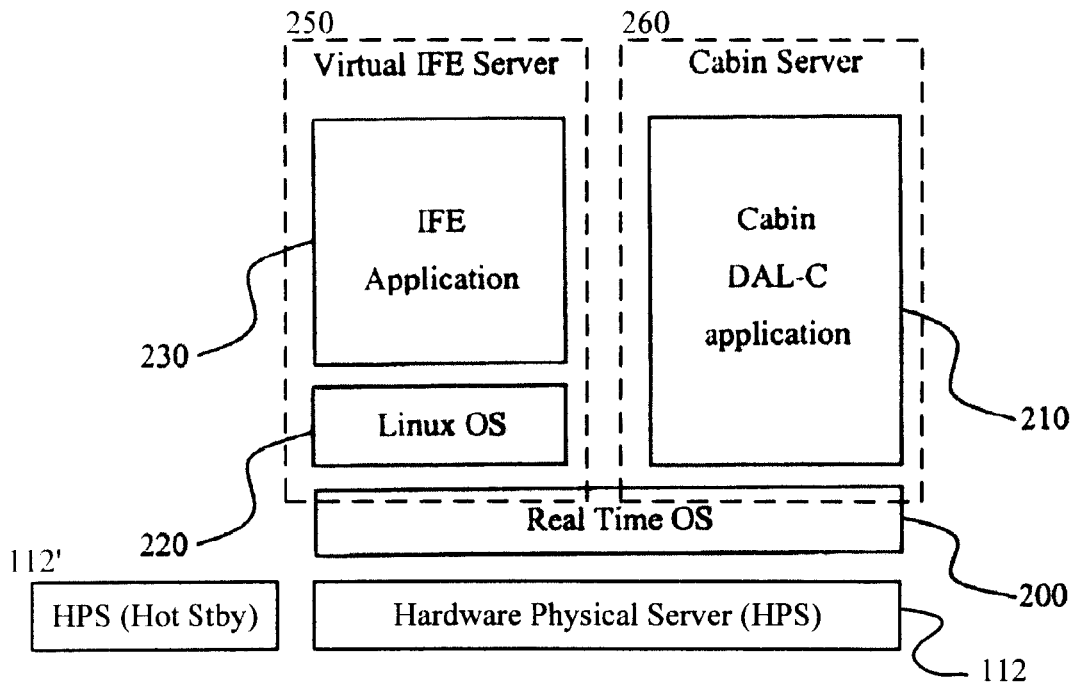
FIG. 4 is a conceptual block diagram illustrating an example of multiple virtual servers in a single hardware configuration.

Referring now to FIG. 4, one of the servers 112 may have a commercially available real time operating system (OS) 200 on top of which runs a secure application for the DAL-C network 210 within the context of a cabin server 260, and an extra OS layer 220 may work with different applications for the IFE DAL-E network 230 within the context of a virtual IFE server 250. Such a software configuration achieves the required isolation since each application runs on a different OS layer and within its own specific server confines. As shown, the IFE application 230 runs within a virtual IFE server 250 that is implemented using the Linux OS 220. This runs on top of the Real-Time OS 200 that is implemented to interact with the hardware physical server 112.

Thus, an IFE application includes an array of multiple virtual servers 250 that operate with various instances of the OS and are logically separated according to services and functions. Since cabin services are more important than in-flight entertainment, the cabin server applications 210 communicate with various devices present in the network 410-480 and have priority over the IFE applications 230, running directly on top of the real-time OS 200. The configuration shown in FIG. 4 also allows for redundancy by having at least one and preferably two physically distinct hardware servers 112' operating in hot stand-by so that a failed server can be quickly replaced and with no or minimal interruption, and allows high density storage devices 310, 320 to also have redundancy.

Figure 5:
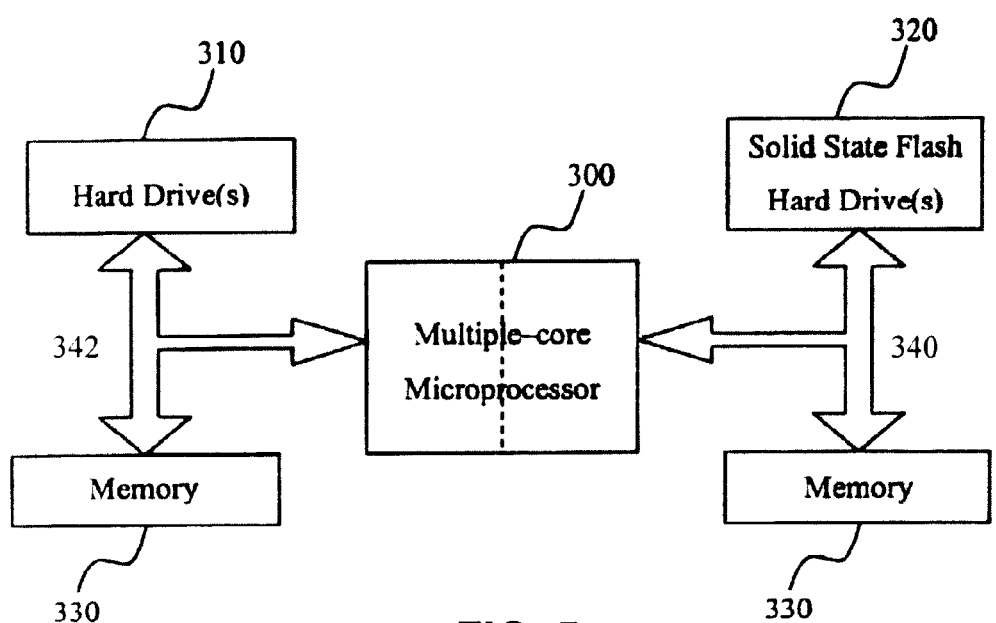
FIG. 5 is a conceptual block diagram illustrating a multi-core hardware architecture for a server according to an embodiment of the present invention.

FIG. 5, shows a hardware design illustrating an embodiment of a hardware platform for a server according to the present invention. As shown in FIG. 5, a multiple-core microprocessor 300 may be coupled to one or more hard drives 310, one or more solid state flash hard drives 320, and to one or more additional memories 330, preferably over respective high-speed busses 340, 342 associated with the processor 300.

Figure 6:
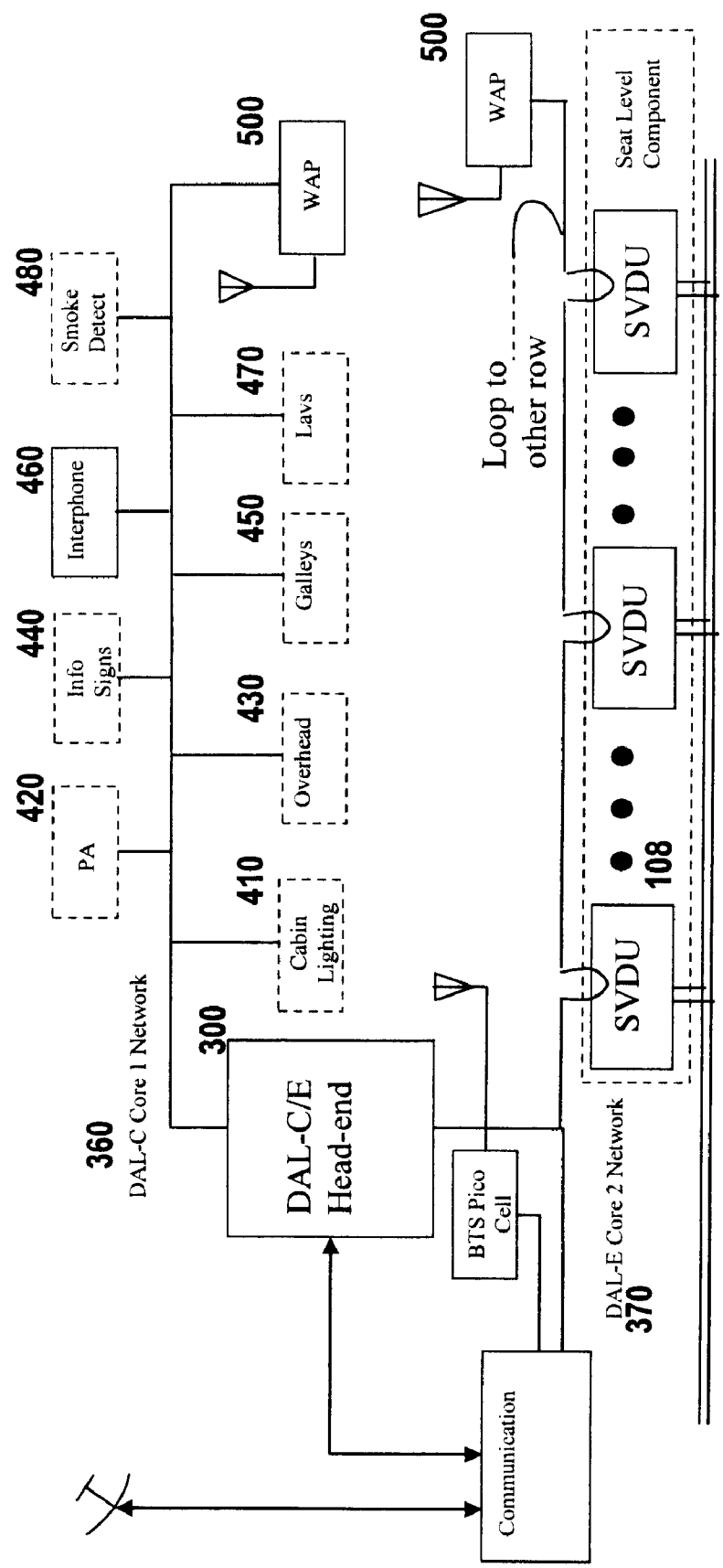
FIG. 6 is a schematic block diagram illustrating the isolation of the respective networks.

FIG. 6 illustrates the use of a multiple-core microprocessor 300 in the head-end that permits the implementation of both the IFE applications 230 and the cabin applications 210 and respective networks, e.g., the DAL-C Core 1 Network 360 and the DAL-E Core 2 Network 370 in common hardware. The services and their specific applications can be performed in the hardware by a mechanism called "virtual server" in an architecture called virtualization. In the virtual server architecture, a physical server computer or processor 300 is partitioned into multiple virtual servers 250, 260 that each appears to running on its own dedicated machine, can run its own operating system, and can be independently rebooted.

The physical server boots into a real-time operating system 200 and then runs a program that boots each virtual server 250, 260. The virtual servers 250, 260 do not have direct access to hardware (e.g., the physical portion of the server 112) or low-level services of the physical server 112. The virtualization can be either software based or hardware based. In the software based virtualization environment, the virtual machines share the same kernel and actually require the main node's resources. In the hardware based virtualization, the virtualization mechanism partitions the real hardware resources—this kind of environment is potentially more secure.

The DAL-E Core 2 Network 370 can be implemented as, e.g., a one-gigabit Ethernet (1GE) local-area network (LAN) that daisy-chains the IFE components, such as the seat-back video display unit (SVDU) 108 that utilizes a low-power ultra-high performance microprocessor. In the SVDU 108, a 1GE switch can be used to deliver the content to the display or route it to a downstream neighbor SVDU 108. The system can therefore be configured to operate in an end-to-end 1 GE network.

The system is optimally designed to handle SVDUs 108 that can decode, e.g., MPEG-2, MPEG-4, H-264 and VC1 with a native resolution of 720 P for a high quality HD video signal (although higher or lower resolutions are within the scope of the invention as well). A set of interfaces allows the SVDU 108 to interface with wireless technologies based on WiMAX, WiFi, DVB-H and others, establishing a path for a wireless network. Furthermore, this design could optimally accommodate productivity applications with, e.g., Microsoft Office® or similar office tools, 3D games with Open GL® and voice-over-Internet (VoIP) applications.

In an embodiment of the invention, the audio and controls associated with the IFE could be sent to a user's headphone and (T)PCU via the 1 GE or by a low bit-rate wireless network that connects the SVDU 108 directly to the seat arm in a master/slave or peer-to-peer relationship. The power can be supplied by a common 48Vdc (or other) feed. In each SVDU 108, a lower power DC to DC converter could be used to step down the required voltage. An audio only solution could also be implemented using a 100 Mbits network and a smart PCU, since the high video data transfer rates are not required.

The software architecture for both the IFE applications 230 and the cabin applications 210 are preferably based on the Service Oriented Architecture (SOA) in order to allow reusability across services, customers and suppliers. With this architecture, the introduction of any compliant service could be integrated without a major software design. The SOA would assure independent evolution on services and the scalability of the technical solution. Within this architecture, the DAL-C, Core 1 network 360 could connect the third parties sensors, devices, and communication gear for the crew. Similarly, all connectivity related to live TV, Internet access, and cell phones may be interconnected to the DAL-E Core 2 network 370 further allowing distribution of pay-per-view content to personal entertainment devices (PEDs). Revenue sharing could be based on bandwidth usage.

While the invention has been disclosed with reference to certain exemplary embodiments, numerous modifications, alterations, and changes to the described embodiments are possible without departing from the sphere and scope of the invention, as defined in the appended claims and equivalents thereof. Accordingly, it is intended that the invention not be limited to the described embodiments, but that it have the full scope defined by the language of the following claims. The reference to "flight" and "aircraft" relate to specific embodiments, and the invention can be generalized to "operation" and "vehicle" accordingly.

Reference has been made to the various embodiments illustrated in the drawings, and specific language has been used to describe these embodiments. However, no limitation of the scope of the invention is intended by this specific language, and the invention should be construed to encompass all embodiments that would normally occur to one of ordinary skill in the art.

The system may use any form of processor and comprise a memory, data storage, and user interface devices, such as a graphical display, keyboard, barcode, mouse, or any other known user input or output device. The system may also be connected to other systems over a network, such as the Internet, and may comprise interfaces for other devices. The software that runs on the system can be stored on a computer-readable media, such as tape, CD-ROM, DVD, or any other known media for program and data storage.

The particular implementations shown and described herein are illustrative examples of the invention and are not intended to otherwise limit the scope of the invention in any way. For the sake of brevity, conventional aspects may not be described in detail. Furthermore, the connecting lines, or connectors shown in the various figures presented are intended to represent example functional relationships and/or physical or logical couplings between the various elements. It should be noted that many alternative or additional functional relationships, physical connections or logical connections may be present in a practical device. Moreover, no item or component is essential to the practice of the invention unless the element is specifically described as "essential" or "critical". The word mechanism is intended to be used generally and is not limited solely to mechanical embodiments. Numerous modifications and adaptations will be readily apparent to those skilled in this art without departing from the spirit and scope of the present invention.

The invention claimed is:

1. A communication system adapted for use on an aircraft, comprising:
   a server including a real time operating system;
   at least one cabin function application executing directly on the real time operating system included in the server, the at least one cabin function application related to operating a hardware component of a cabin of the aircraft;
   a virtual machine included in the server and executing on the real time operating system included in the server, the virtual machine including a second operating system, different from the real time operating system; and
   at least one entertainment application executing on the second operating system in the virtual machine in the server, the at least one entertainment application configured to provide content for an entertainment system; and
   wherein the at least one cabin function application executing directly on the real time operating system and the at least one entertainment application executing on the second operating system are isolated as each runs on a different operating system layer and within separate server confines.

2. The communication system according to claim 1, wherein the second operating system executes separately with respect to the real time operating system.

3. The communication system according to claim 1, wherein the server comprises a multiple-core microprocessor.

4. The communication system according to claim 3, wherein the server further comprises a plurality of storage devices communicatively coupled to the multiple-core microprocessor.

5. The communication system according to claim 4, wherein the plurality of storage devices comprise at least one of a hard drive, a solid state storage device, and a memory.

6. The communication system according to claim 5, wherein the entertainment application is stored on the hard drive, and the cabin function application is stored on the solid state storage device.

7. The communication system according to claim 1, wherein the cabin function is selected from the group consisting of cabin lighting, public address system, overhead, information signs, galley operation, interphone operation, lavatory operation, smoke detectors, and environmental functions.

8. The communication system according to claim 1, wherein the second operating system is implemented as a software-based virtual server.

9. The communication system according to claim 1 the second operating system is Linux.

10. The communication system according to claim 1, further comprising a redundant hot-stand-by server that can replace the server in an event of a server failure.

11. The communication system according to claim 1, wherein the cabin function applications and the entertainment applications are implemented as Service Oriented Architecture applications.

12. The communication system according to claim 1, wherein the cabin function applications access aircraft cabin components over a first cabin function network, and the entertainment applications access entertainment system components over a second entertainment network.

13. The communication system according to claim 12, further comprising a memory partition that separates the first cabin function network and the second entertainment network.

14. The communication system according to claim 12, wherein the entertainment network comprises a 1 gigabit/sec Ethernet network.

15. The communication system according to claim 12, wherein at least one of the first cabin function network and the second entertainment network comprises a wireless access point.

16. The communication system according to claim 15, wherein the wireless access point is ARINC 763 compliant, and is based on IEEE 802.11.

17. The communication system according to claim 15, wherein the wireless access point utilizes Direct Sequence Spread Spectrum.

18. The communication system according to claim 15, wherein at least one of the cabin function system components and entertainment system components is a wireless component that utilizes the wireless access point.

19. The communication system according to claim 12, further comprising a seat video display unit that interfaces with the second entertainment network via which it receives audiovisual data.

20. The communication system according to claim 19, wherein the audiovisual data has a format selected from the group consisting of MPEG-2, MPEG-4, H-264, and VC1 format.

21. The communication system according to claim 19, wherein the seat video display unit comprises a wireless interface selected from the group consisting of WiMAX, WiFi, and DVB-H.

22. The communication system according to claim 1, wherein the at least one entertainment application includes an application selected from the group consisting of office productivity applications, 3D games with Open GL, and voice-over-Internet applications.

23. The communication system according to claim 1, wherein the at least one cabin function application executes directly on the real time operating system without intervening layers between the cabin function application and the real time operating system.

24. The communication system according to claim 1, wherein the second operating system executes directly on the real time operating system.

* * * * *